I (12) United States Patent
Ng (10) Patent No.: US 12,296,983 B2
(45) Date of Patent: May 13, 2025

(54) TETHERED ROBOTIC SYSTEM WITH ENHANCED MOBILITY

(71) Applicant: Nact Engineering Pte. Ltd., Singapore (SG)

(72) Inventor: Aik Thong Ng, Singapore (SG)

(73) Assignee: NACT ENGINEERING PTE. LTD., Singapore (SG)

( * ) Notice: Subject to any disclaimer, the term of this patent is extended or adjusted under 35 U.S.C. 154(b) by 351 days.

(21) Appl. No.: 17/204,960

(22) Filed: Mar. 18, 2021

(65) Prior Publication Data

US 2021/0292007 A1  Sep. 23, 2021

Related U.S. Application Data

(60) Provisional application No. 62/991,596, filed on Mar. 19, 2020.

(51) Int. Cl.
| | |
|---|---|
| *B64F 3/00* | (2006.01) |
| *B64U 10/16* | (2023.01) |
| *B64U 10/60* | (2023.01) |
| *B66D 1/50* | (2006.01) |

(52) U.S. Cl.
CPC .............. *B64F 3/00* (2013.01); *B64U 10/60* (2023.01); *B66D 1/505* (2013.01); *B64U 10/16* (2023.01); *B64U 2201/202* (2023.01)

(58) Field of Classification Search
CPC . B64F 3/00; B64F 3/02; B64C 39/022; B64U 10/60; B64U 2201/202
See application file for complete search history.

(56) References Cited

U.S. PATENT DOCUMENTS

| | | | |
|---|---|---|---|
| 11,008,101 B2 * | 5/2021 | Miller | ........................ B64D 1/22 |
| 2007/0200027 A1 | 8/2007 | Johnson | |
| 2022/0324563 A1 * | 10/2022 | Tazume | ................. B64C 39/024 |

FOREIGN PATENT DOCUMENTS

| | | | | |
|---|---|---|---|---|
| EP | 3211226 A1 | 8/2017 | | |
| KR | 101467887 B1 | 12/2014 | | |
| KR | 102026793 B1 * | 11/2019 | | ................. B64F 3/02 |
| WO | 2018156991 A1 | 8/2018 | | |
| WO | 2019232617 A1 | 12/2019 | | |

\* cited by examiner

*Primary Examiner* — Joshua J Michener
*Assistant Examiner* — Arfran Y. Sinaki
(74) *Attorney, Agent, or Firm* — HORIZON IP PTE LTD.

(57) ABSTRACT

An unmanned robot system for a tethered robot, for example, a tethered aircraft, is disclosed. The unmanned system, in one embodiment, includes an unmanned aircraft tethered to a ground station by a tether cable. In one embodiment, an aerial winch and cable unit is provided on the aircraft to manage cable release. Alternatively, winch and cable units may be provided on both the aircraft and ground station. As the aircraft is now able to freely operate cable release to overcome any disturbances along the cable length, the operational effectiveness of the aircraft is greatly improved.

12 Claims, 11 Drawing Sheets

TETHERED ROBOTIC SYSTEM WITH ENHANCED MOBILITY

CROSS-REFERENCE TO RELATED APPLICATION

This application claims the benefit of U.S. Provisional Application No. 62/991,596, titled "TETHERED DRONE", filed on Mar. 19, 2020, which is incorporated herein by reference in its entirety for all purposes.

FIELD OF THE INVENTION

The present disclosure relates to unmanned robotics. In particular, the disclosure relates to unmanned robots configured with a tethering system for effective operation.

BACKGROUND

Unmanned robotics, especially unmanned aircraft or drones are finding numerous applications. Drones are used in, for example, security monitoring, delivery services, capturing pictures or videos, as well as other applications. To serve these purposes, drones may be mounted with one or multiple payloads. Payloads, for example, may include cameras, packages as well as other types of payloads.

The increased use of drones for various applications has also led to a demand for longer flight or operational time. To meet these requirements, there is a shift in focus towards tethered drones which are powered by an external power source from the ground. For example, the tethered drone is mechanically connected to a power station on the ground via a tether cable. Unlike a free flying drone which relies on its on-board battery and therefore has a limited flight time, the tether cable supplies power from the ground station to the tethered done to sustain a longer flight time. The tether cable also enables stable data communication between the drone and the ground station. Moreover, by containing the flight zone within a range of its tether length, the position of the drone can be easily tracked and this also prevents the drone from flying away from its designated area.

However, the tether cable also poses certain limitations to the performance of the drone. As the extension of the tether cable is typically managed by a winch on the ground, for example, on the ground station, any disturbances along the length of the tether cable directly affect the operation of the drone. For example, tether cable entanglement or friction of the tether cable against objects or obstructions along the flight path. Such friction interrupts flight operation and also restricts horizontal flight travel. In addition, these disturbances can even be disruptive, such as causing a crash.

Therefore, from the foregoing discussion, there is a need to provide an unmanned system configured with a tethering system for effective operation.

SUMMARY

Embodiments generally relate to effective operation of tethered robots, such as aircraft and other types of robots. In particular, the disclosure relates to an unmanned tethered aircraft configured with a cable management system for effective operation. The cable management system may also be applied to other types of robots.

In one embodiment, a system includes a ground station, and an unmanned robot including a robotic controller module configured to control operations of the unmanned robot, and a winch and cable unit mounted on the aircraft, the winch and cable unit includes a spool for accommodating a tether cable, wherein the tether cable includes a first end connected to the winch and cable unit, a second end connected to the ground station, and wherein the second end includes an extendable end which is by releasing the tether cable from the spool during flight.

In another embodiment, a method of operating an unmanned robot includes providing an unmanned robot including a robotic controller module configured to control operations of the unmanned robot, and a winch and cable unit mounted on the unmanned robot, the winch and cable unit includes a spool for accommodating a tether cable, wherein the tether cable comprises a first end connected to the winch and cable unit; tethering the unmanned robot to a ground station by connecting a second end of the tether cable to the ground station, wherein the second end includes an extendable end; and operating the robot using the robotic controller module, wherein during operation, the robotic controller module is configured to activate the spool to release the tether cable at the extendable end.

In yet another embodiment, an unmanned robot includes a robot body, a robotic controller module configured to control operations of the unmanned robot, and a winch and cable unit mounted on the robot body, the winch and cable unit includes a spool for accommodating a tether cable, wherein the tether cable includes a first end connected to the winch and cable unit, a second end connected to the ground station, and wherein the second end includes an extendable end which is by releasing the tether cable from the winch during operation.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of various embodiments. In the following description, various embodiments of the present disclosure are described with reference to the following, in which.

DETAILED DESCRIPTION

Embodiments described herein generally relate to unmanned robots, including unmanned aircraft, such as drones. In particular, the embodiments relate to unmanned robots, such as aircraft, configured with a tethering system for effective operation.

Figure 1A:
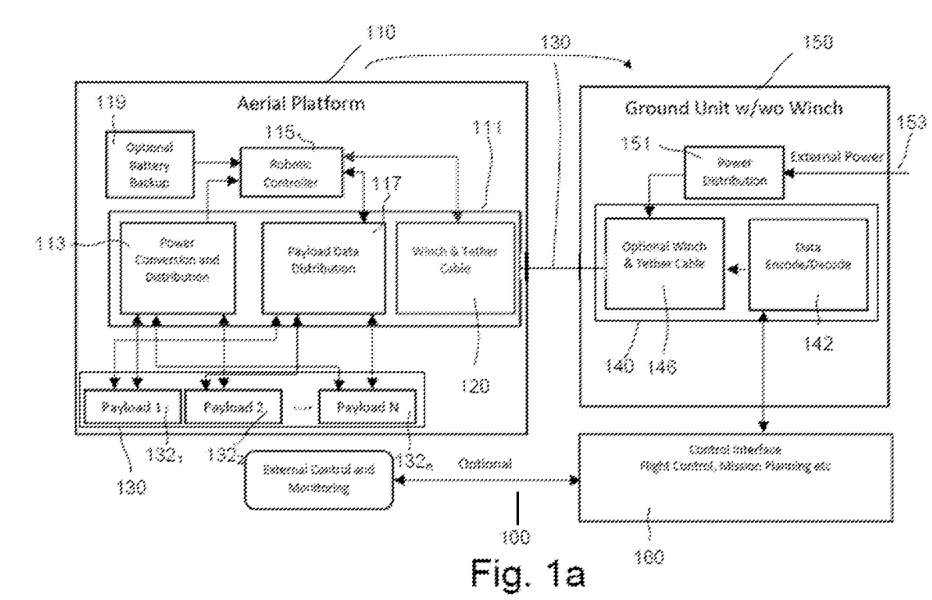
FIG. 1a shows a simplified block diagram of an unmanned aircraft system.

FIG. 1a shows a simplified block diagram of an embodiment of an unmanned robotic system, for example, an unmanned aircraft system 100. The unmanned aircraft system 100, in one embodiment, includes a robot or aerial platform 110, a ground station 150, and a user control interface 160. The aerial platform, for example, includes an unmanned aircraft, such as a drone, and various components and is physically connected to the ground station by a tether cable 130. Providing other configurations of the platform may also be possible. For example, instead of an unmanned aircraft, a robot configured to operate on land and/or even underwater can be employed. Any other types of robots may also be possible.

In one embodiment, the aerial platform includes a main operational module 111, a payload module 130, and a robotic controller module 115. Optionally, the aerial platform may include a backup power module 119, such as a backup battery. Providing the aerial platform with other modules may also be useful.

The main operational module, as shown, includes a power conversion and distribution unit 113, a payload data distribution unit 117 and an aerial winch and cable unit 120. The payload module 130 includes a plurality of payloads $132_{1-N}$ of the aerial platform. A payload can be any kind of payload mounted on the unmanned aircraft, including propulsion and guidance units for flying the drone, cargo, scientific instruments, power source, and monitoring instruments, such as sensors, including image sensors. Regarding propulsion units, each individual propulsion unit can be considered as a payload unit which can be controlled to maneuver the drone. In addition, the backup power module and the robotic controller module may be considered as payloads of the aerial platform.

In one embodiment, the aerial winch and cable unit 120 includes a winch on which a tether cable is wound. The aerial winch and cable unit, in one embodiment, includes a winch housing holding the winch and cable unit. For example, the housing is hard mounted on the drone. A first end of the tether cable is connected to the winch. The first end, for example, is a fixed end fixed to the winch. A second end of the tether cable, in one embodiment, is connected to the ground station 150. The second end, for example, is an extendable end.

The length of the tether cable is accommodated by the winch. The length, for example, may be about 100 m or more. Other lengths may also be useful. Preferably, the length of the tether cable should be sufficient to cover the desired flight distance of the drone. For example, the length should be sufficient to accommodate release of additional tether cable length when cable entanglements are encountered during flight operation. In one embodiment, the winch is a motorized or active winch. The motor of the winch, for example, is controlled by the robotic controller module 115.

In one embodiment, the motorized winch may be configured to operate in various modes. For example, the winch can be programmed to operate in a constant tension release mode, an active sense mode or an active release mode. Other operating modes for the winch can also be useful. The winch, in one embodiment, includes a load sensor. The load sensor, for example, is a torque sensor. For example, the torque sensor is configured to sense torque forces on the tether cable and feedback to the robotic controller module. The torque sensor may be a mechanical sensor. Other types of sensors may also be possible. Providing other types of torque information, such as those which can infer using motor current based on torque constant, or known and tested values, may also be useful.

The torque sensor is preset with a threshold torque value. In one embodiment, the threshold torque value is set at a level of 5 Nm of torque. The threshold torque value defines the magnitude of cable tension required in an operation. For example, torque value is translated to a cable tension value by the following equation:

$$\text{Cable Tension} = \text{Torque} \times \text{Winch Diameter}$$

Providing other threshold torque values may also be useful. For example, the threshold torque value may be programmed based on a size and/or weight of the drone, travel paths as well as applications of the drone. Additionally, the threshold torque value may be adjusted dynamically at any time of a flight.

When operating in the constant tension mode, the winch constantly exerts a preprogrammed magnitude of load on the tether cable. For example, the preprogrammed load magnitude is configured to maintain a tether cable at a constant tension value. The preprogrammed magnitude of load may be, for example, the same as the threshold torque value. In the case when the cable tension exceeds the constant tension value, the motor will be forced to release tether cable as the cable tension exceeds the force applied by the winch. However, the tether cable tension remains at the constant tension value as a result of tether cable released from the winch. Alternatively, the tether cable is released by free wheeling by setting constant tension force=0. Should the cable tension be lower than the constant tension force acted upon by the winch, the winch will retract the tether cable. This dynamic response of the winch is particularly useful for movement stability as cable tension is always maintained. In addition, constant tension mode ensures that aircraft disturbance is limited to a constant tension pull, and therefore limits tensions that can result in an abrupt tension due to cable entanglement. Limiting flight disturbance ensures drone operational safety so long the constant tension force is within drone safety weight bearing limits.

When operating in the active sense mode, the torque sensor is configured to periodically sense the load on the tether cable and feedback to the robotic controller module as well as the motor to determine the condition to release or retract the tether cable. For example, when the torque sensor senses a load that exceeds the threshold torque value, the motor is activated to release the tether cable. In one embodiment, a predetermined length of the tether cable is released. For example, about 1 m of tether cable is released. Alternatively, the tether cable may be released from the winch by free wheeling which utilizes cable tension. If the torque sensor senses a load that is less than the threshold torque value, the motor is activated to retract the cable until the load is equal to the threshold torque value.

In the active sense mode, the threshold torque value may be implemented as a threshold torque range. For example, the motor remains locked when the sensed torque value is within the threshold torque range. For example, tether cable is not released or retracted. Motor lock position can be achieved by, for example, a brake mechanism, or simply activating the motor to resist changes in cable length Unlike the constant tension mode, the tether cable is not maintained at a constant tension value. For example, there is no need for the drone to apply cable tension to maintain a constant tension value. This advantageously eases the burden or stress on the propulsion units of the drone. For instance, for a threshold torque range of 2-10N, the winch only acts to retract the tether cable if the cable tension is less than 2N, whereas the winch only releases cable periodically when the cable tension is or exceeds 10N. This potentially exerts less stress on the drone than a constant tension mode set at 10N, as the torque value can reach as low as 2N before the winch starts retracting tether cable to remain in the threshold torque range. This is particularly useful for periodical stationary drone operations.

As for the active release mode, the tether cable is released from the winch without the need for sensing cable tension. For example, in the active release mode, the torque sensor is switched off or inactive. The motor is activated to release the tether cable. The active release mode may be activated during take-off. After reaching a certain distance, the constant tension mode or the active sense mode may be activated. Alternatively, the active release mode may be a freewheeling mode. For example, the winch may be freewheeling, without activating the motor.

In other embodiments, the winch may be a freewheeling winch. For example, the winch is a passive winch which releases the tether cable upon tension. In some cases, a mechanical device such as a clutch can be provided to enable the winch to release the tether cable after encountering a load which exceeds a threshold torque value. Unlike a motorized winch, the freewheeling winch is unable to retract the tether cable once it is released.

In one embodiment, the ground station includes a ground coupler module 140 and ground power source module 151. The ground power source module 151 may carry its own energy storage device, such as a battery, that enables operation of the system in the absence of external power source. In such cases, the ground power source module 151 is able to utilize its own low voltage energy storage device to produce high DC voltage, for example, up to 6000V, so that a tether cable with thin cable thickness and lower cable density can be deployed for the power transmission. The ground power source module is coupled to an external power source 153 to provide power to the drone via the tether cable. In one embodiment, the external power source 153 is a portable battery source. In one embodiment, the external power source 153 is a generator or grid provided AC voltage source. In one embodiment, the external power source 153 is a high voltage DC voltage source. As for the ground coupler module, it includes a ground data communication unit 142. The ground data communication unit, in one embodiment, communicates control signals to the aerial platform from the user control interface 160. While a stationary ground station is shown, it is understood that the ground station can be mobile or stationary depending on the applications or configurations of the unmanned aircraft system.

The user control interface, for example, is a radio control interface for the user to control the drone. For example, the user control interface includes controllers for flight control such as controlling the flight of the drone, as well as other controllers including payload controllers for controlling payloads on the drone.

The tether cable includes power and data connections between the aerial platform and the ground station. For example, power from the ground power source module and control signals are exchanged between the aerial platform and ground station. In addition, data captured from payloads, such as remote sensors, are transmitted to the ground station via the tether cable. The power conversion and distribution unit 113 converts the high DC voltage to lower DC voltages usable by the payloads. Furthermore, the converted DC voltage may also be used to charge the backup battery to ensure that it is fully charged.

In one embodiment, the data and control signals may be optionally provided wirelessly between the aerial platform and the user control interface 160. For example, the drone can operate independently of the ground station and only through the user control interface. This is particularly useful in the case where there are problems with communicating data and control signals through the tether cable, direct communication between the aerial platform and the control interface module can still remain effective.

In one embodiment, the second end of the tether cable is hard terminated to the ground station. For example, the second end of the tether cable is fixed to the ground station. In another embodiment, the ground station includes a ground winch and cable unit 146. The ground winch and cable unit on the ground station may be the same as the aerial winch and cable unit. For example, the ground winch and cable unit may include a motorized winch. Other types of winches for the ground winch and cable unit may also be useful. For example, the winch for the ground winch and cable unit can have a larger footprint than that of the drone. The ground winch and cable unit may be mounted anywhere on the ground station. For example, the ground winch and cable unit may be housed inside the ground station or mounted outside the housing of the ground station. Providing more than one ground winch and cable unit on the ground station may also be possible.

In one embodiment, in the case where both ground and aerial winch and cable units are employed, they may be configured to have on and off modes which can be controlled by the user. For example, at the start of the flight, the aerial winch and cable unit may be switched off while only the ground winch and cable unit is operational. In such cases, the tether cable is only released from the ground. After a desired distance from the ground station, the aerial winch and cable unit may be switched on, enabling tether cable release from both the ground and aerial winch and cable units. This conserves the tether cable length on the drone. Other configurations of operating the winch and cable units may also be useful. For example, both ground and aerial winch and cable units can be operational before flight. In such cases, the tether cable can be released from both the ground station and from the drone. This is useful in applications where the unmannered aircraft system is configured to be mobile. For example, both the tethered aircraft and the ground station are mobile. For example, after the drone anchors itself at a location away from the ground station, the ground winch and cable unit is activated to wind the tether cable from the ground station. This in turn exerts a pull or drag force which causes the ground station to move towards the drone.

Figure 1B:
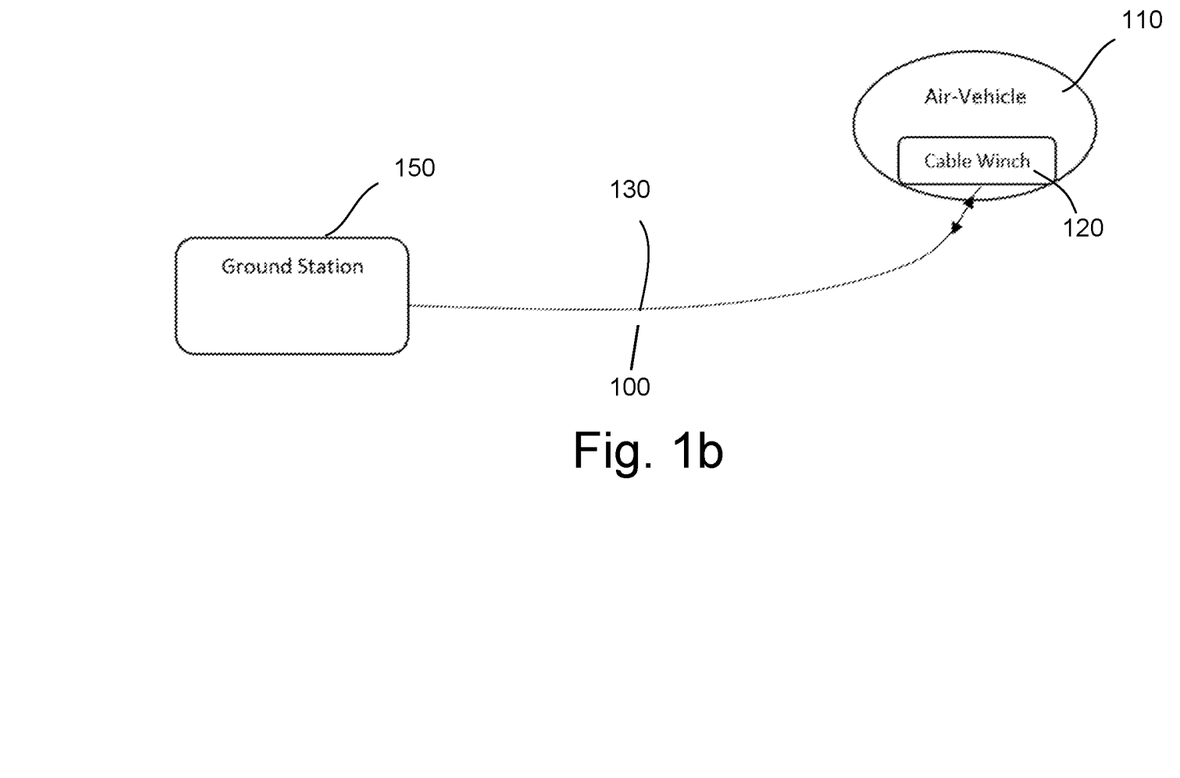
FIGS. 1b-1c show various simplified diagrams of embodiments of an unmanned aircraft in flight.
Figure 1C:
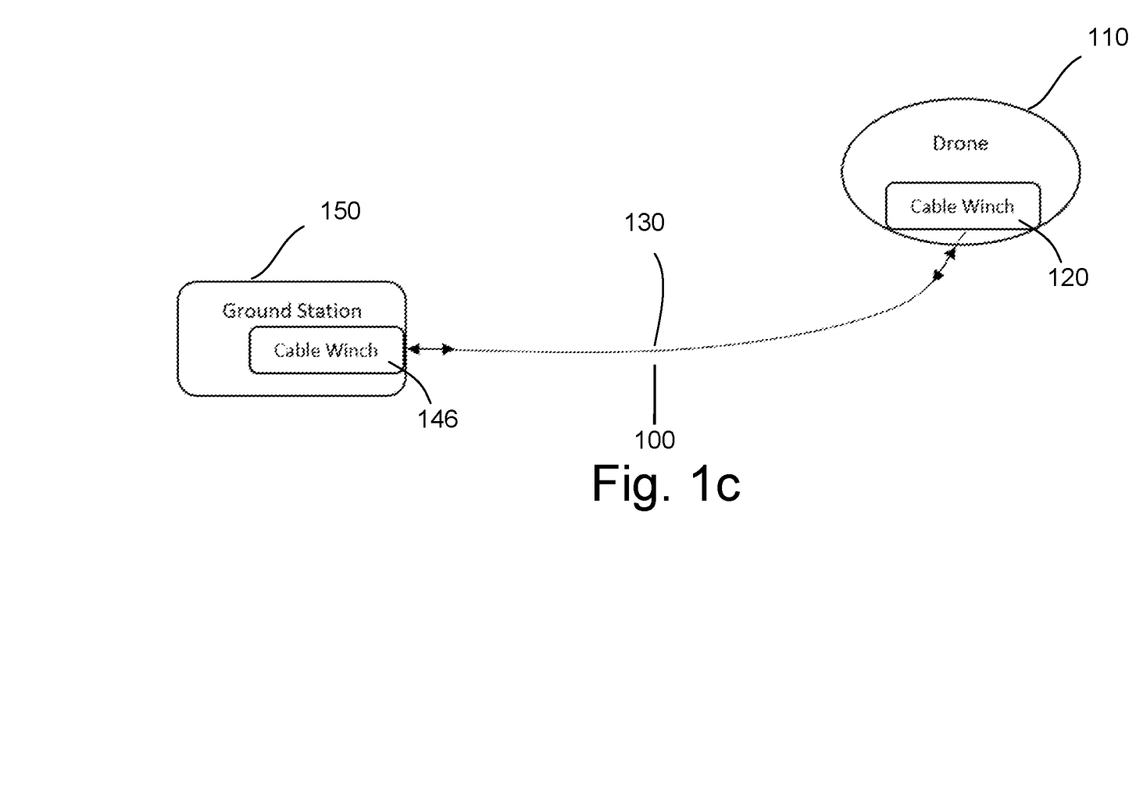

FIGS. 1*b*-1*c* show simplified diagrams 100 of embodiments of a drone in flight. As shown in FIG. 1*b*, the aerial platform or drone 110 includes an aerial winch and cable unit 120 while the ground station 150 does not. For example, the tether cable 130 is coupled to the winch on the aerial platform and to the ground station without a winch. During flight, the tether cable is released from the drone. As for FIG. 1*c*, the ground station 150 includes a ground winch and cable unit 146. One end of the tether cable is connected to the aerial winch and cable unit 120 on the drone while the other end is connected to the ground winch and cable unit 146 on the ground station. During flight, the tether cable is released from both the ground station and the drone.

In one embodiment, the ground winch and cable unit on the ground station may be the same as the aerial winch and cable unit. For example, the ground winch and cable unit may include a motorized winch. Other types of winches for the ground winch and cable unit may also be useful. The ground winch and cable unit may be mounted anywhere on the ground station. For example, the ground winch and cable unit may be housed inside the ground station or mounted outside the housing of the ground station. Providing more than one ground winch and cable unit on the ground station may also be possible.

Figure 2:
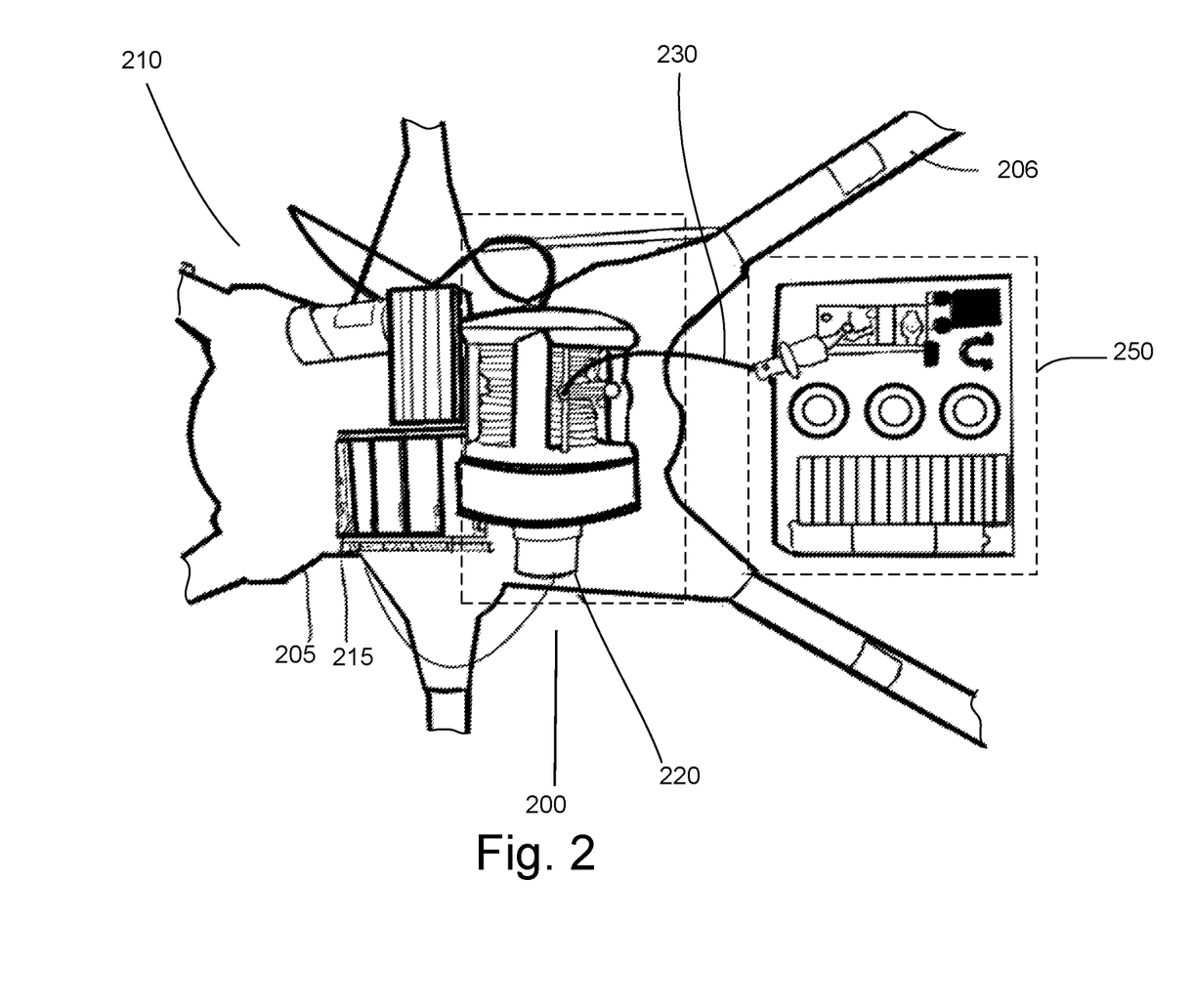
FIG. 2 shows another embodiment of an unmanned aircraft system.

FIG. 2 illustrates an embodiment of an unmanned aircraft system 200. As shown, the system includes an unmanned aircraft 210, such as a drone. The aircraft includes an aircraft body 205. Extending from the aircraft body are extensions 206 for supporting propulsion units. For example, the body includes six extensions for supporting six propulsion units for flying the drone. Providing any other numbers of extensions or propulsion units may also be possible. The propulsion unit can be configured to work in unison to fly the drone as desired. In one embodiment, an aerial winch and cable unit 220 is mounted on the body of the aircraft. The aerial winch and cable unit includes a motorized winch with a wounded tether cable 230. One end of the tether cable is fixed to the winch while the other end is fixed to the ground station 250. For example, a first tether cable end is attached to the winch and a second tether cable end is attached to the ground station. When fully unwound, an extension portion of the tether cable is fixed and is connected to the power conversion unit and payload data distribution unit of the drone. For example, power is provided to the power conversion unit to convert the high DC voltage from the ground station to lower DC voltages for use by the payloads of the drone. Control signals and data are exchanged between the payload data distribution unit and the ground station. In addition, a robotic controller 215 controls the motor of the motorized winch and cable unit.

Figure 3:
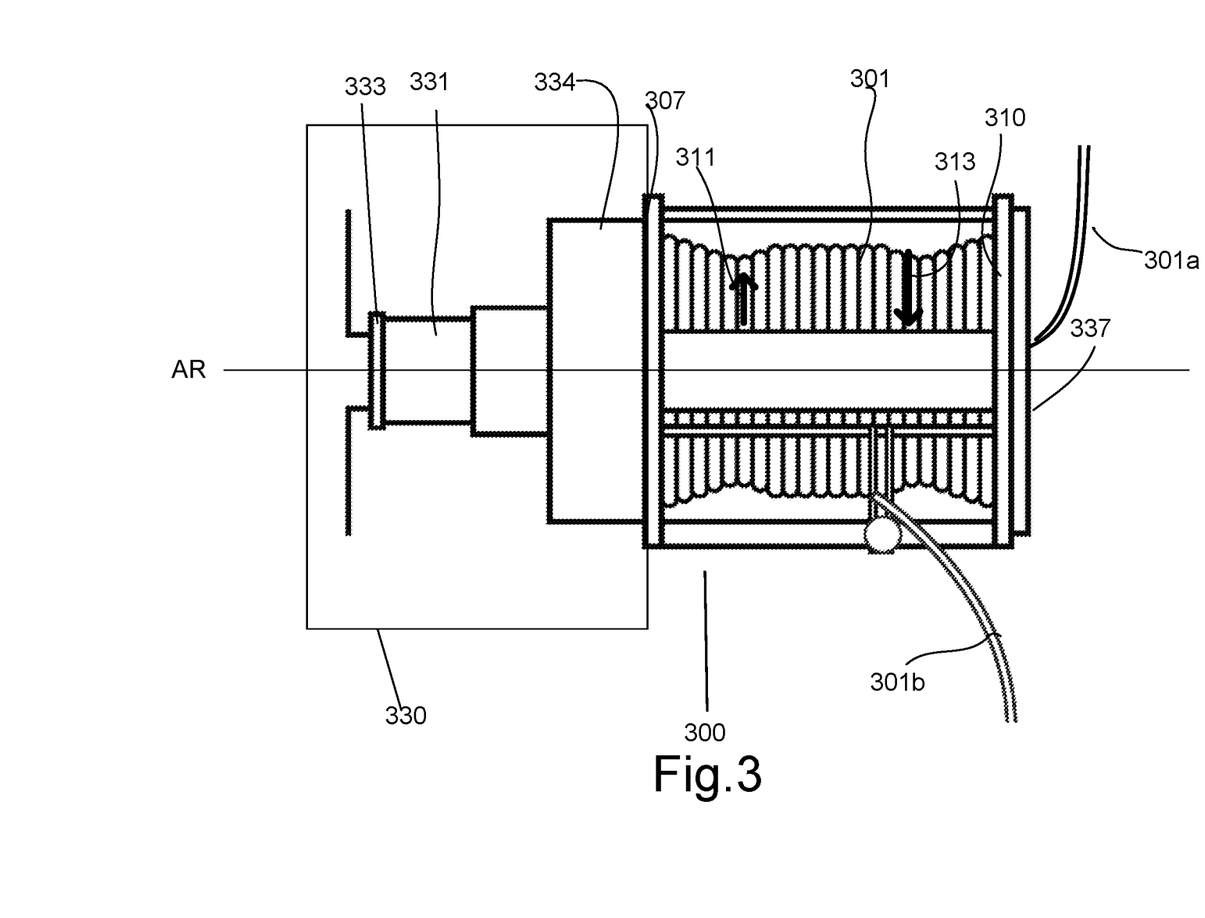
FIG. 3 shows an embodiment of a motorized winch and cable unit.

FIG. 3 shows an embodiment of a motorized winch and cable unit 300. The winch and cable unit includes a winch mount or housing 307. The winch housing, for example, is a cage-like structure configured to house a spool 310 of a winch. The spool is configured to rotate about an axis of rotation AR within the winch housing. A motor assembly 330 is mounted onto the winch housing. The motor assembly, as shown, is mounted on a side of the winch housing. The motor assembly, in one embodiment, includes a gear unit 334 and a motor unit 331 configured for rotating the spool in first and second opposing directions 311 and 313. The first direction, for example, may be in the clockwise direction while the other is in the counterclockwise direction.

The motor unit 331, for example, includes an electric motor with a motor controller 333. The motor is configured to cooperate with the gears in the gear unit 334 to rotate the spool 310 when power is applied. Depending on the control signals sent to the motor controller 333, the motor rotates the spool in either the first or second direction.

A tether cable 301 is wound around the spool. A first end of the tether cable includes a fixed end connected to the spool. The first end includes a fixed length first end portion 301a which extends out of the spool. The first end, for example, supplies power and controls signals from the ground station, including the exchange of data between the drone and ground station. As for the second end, it is an extendable end 301b and is connected to the ground station. An internal slip ring 337 is coupled to the spool. In the case that the motorized winch and cable unit is provided for the ground station, the slip ring facilitates to transfer power from the ground power source module of the ground station to the tether cable.

In one embodiment, the winch can be configured to operate in a constant tension mode, an active sense mode or an active release mode. Other operating modes may also be useful. For example, control signals from the ground station can be provided to configure the operating mode of the winch. Other configurations of the winch may also be useful.

Figure 4:
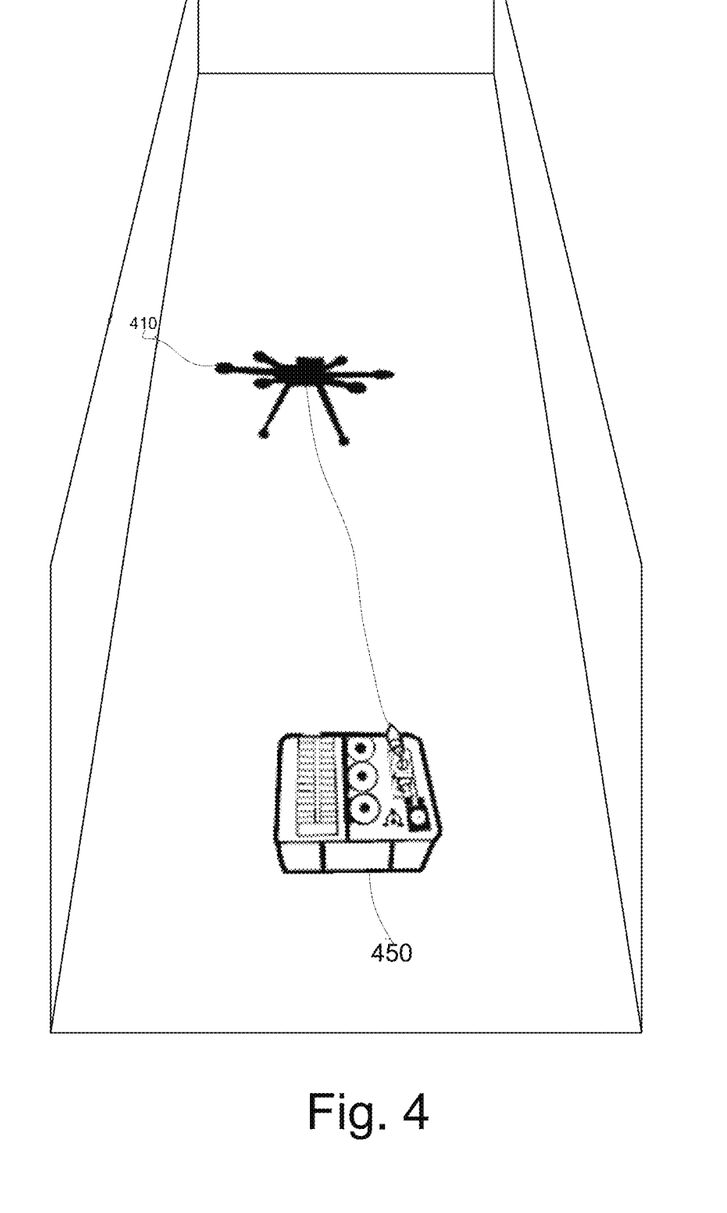
FIGS. 4 and 5a-5b illustrate various operations of an exemplary tethered aircraft with an aerial winch and cable unit.
Figure 5A:
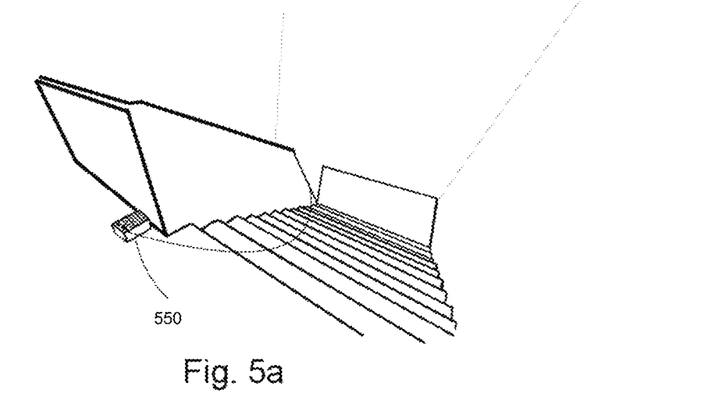
Figure 5B:
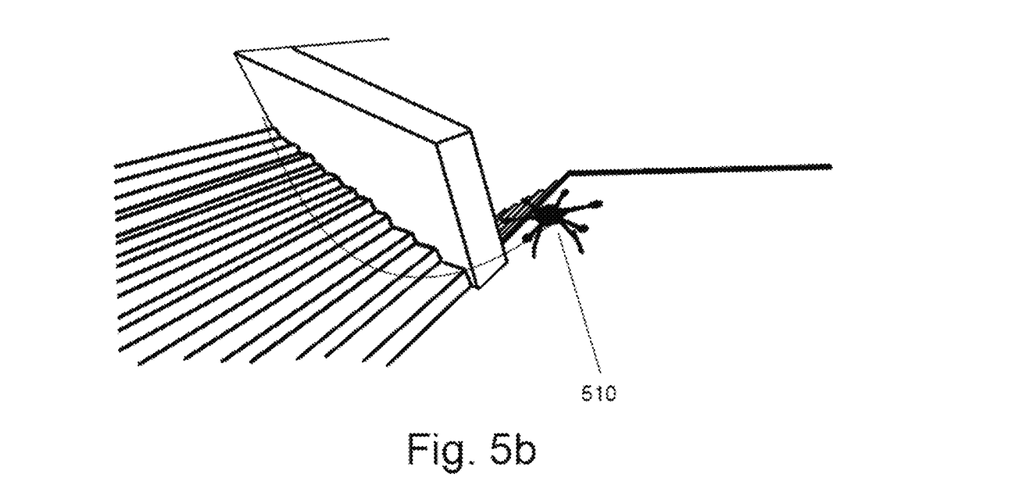

FIGS. 4 and 5a-5b illustrate various operations of an exemplary unmanned tethered aircraft with an aerial winch and cable unit. As shown in FIG. 4, unlike a typical tethered aircraft, the tethered aircraft 410 with the aerial winch and cable unit is now able to participate in horizontal operations. For example, by using the aerial winch and cable unit to facilitate tether cable release from the aircraft, the additional released length of the tether cable allows the tethered aircraft to travel horizontally. This eliminates the issues faced when relying on the ground station 450 for tether cable release. For example, problems such as excessive ground friction on the tether cable or cable entanglements which hinder and discourage horizontal flight travel.

In addition, freedom to operate tether cable release from the tethered aircraft also provides the tethered aircraft a greater degree of freedom to travel. For example, as shown in FIGS. 5a-5b, the tethered aircraft 510 is able to maneuver through bends and corners along the stairway while the ground station 550 remains stationed at a top of the stairway.

Figure 6:
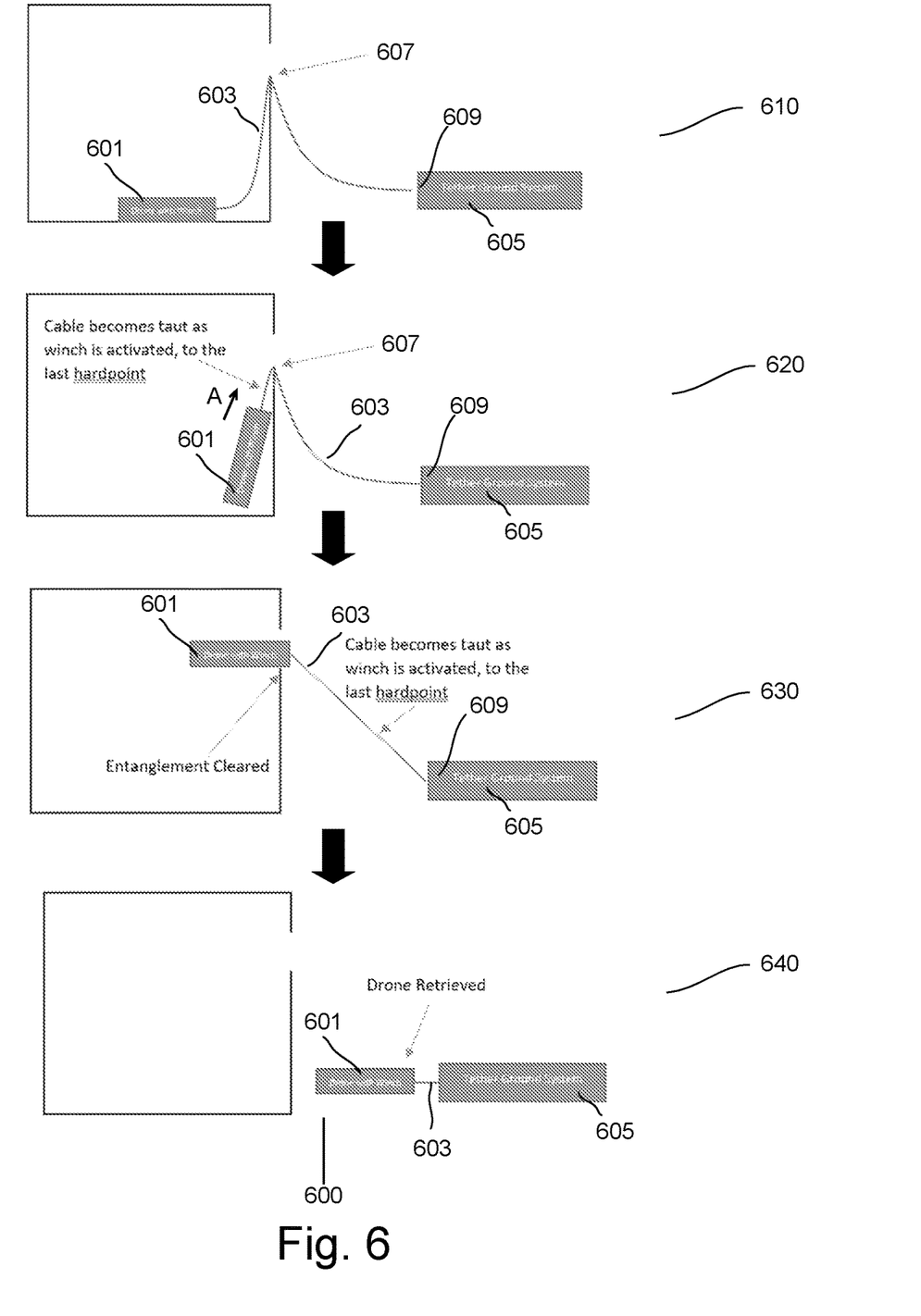
FIG. 6 illustrates an exemplary process flow to recover a deployed tethered aircraft.
Figure 7:
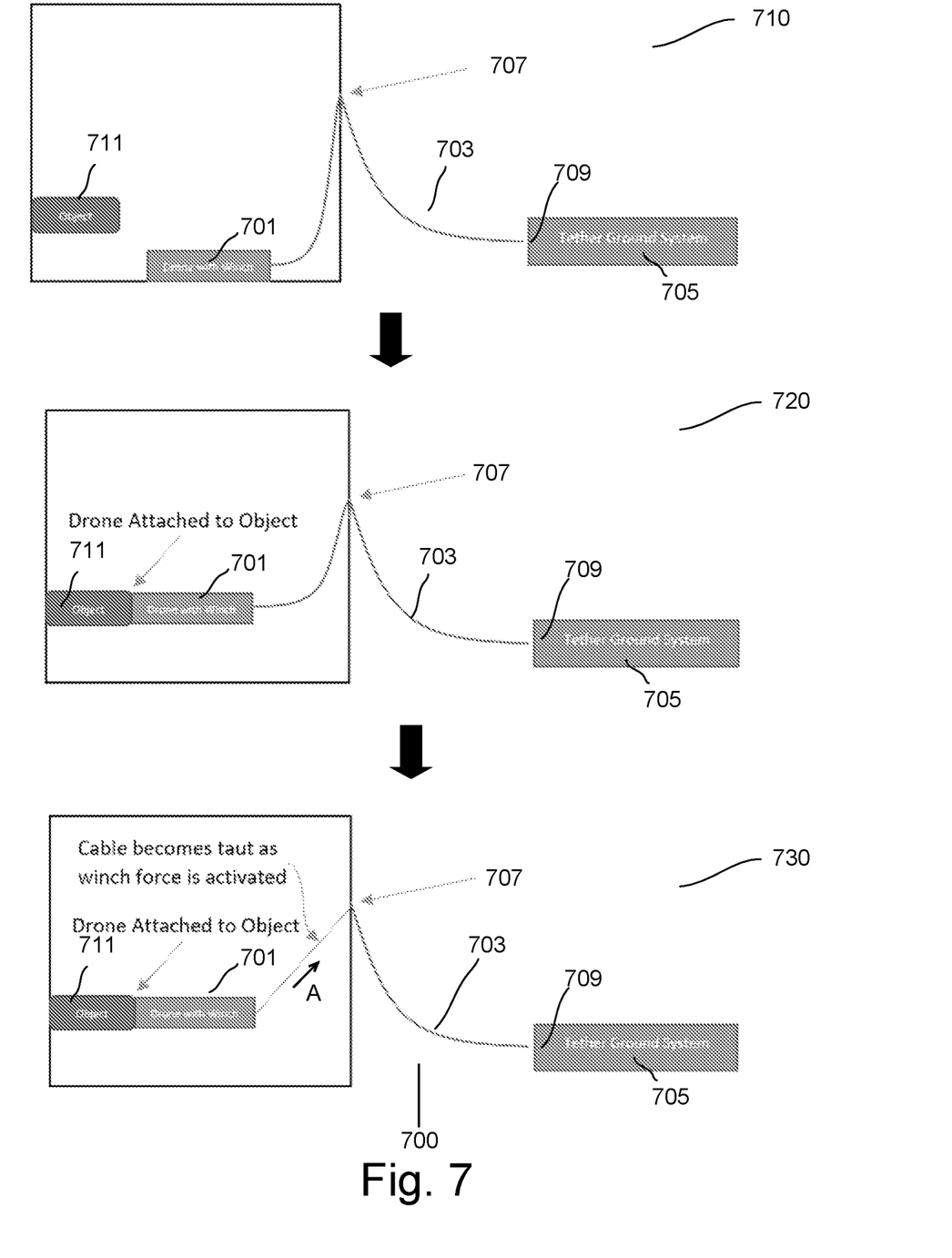
FIG. 7 illustrates a process flow to retrieve a tethered aircraft carrying objects.

FIGS. 6-7 illustrate various applications of an exemplary unmannered aircraft system. As discussed, the system may include an unmanned tethered aircraft mounted with an aerial winch and cable unit.

The system may utilize the aerial winch and cable unit to perform recovery of deployed tethered aircraft. For example, the winch of the aerial winch and cable unit is activated to retract or wind the tether cable to generate a pull force on the tethered aircraft. When the tether cable is wound back, the ground station to which the other end of the tether cable is coupled to serves as the pivot or stationary point to guide a pulling direction of the tethered aircraft. For example, the tethered aircraft is pulled in a reverse direction along a cable path and towards the ground station. This allows deployed tethered aircraft to be recovered independently of its propulsion system. For example, recovering a crashed aircraft which is unable to fly. Moreover, as the winch and cable unit is able to generate a higher force throughput than the propulsion system, a more efficient method of recovering tethered aircraft is achieved.

FIG. 6 illustrates an exemplary process flow 600 to recover a deployed tethered aircraft. At 610, a tethered aircraft 601 with the aerial winch and cable unit is at rest on a site away from the ground station 605. The ground station serves as a final pivot or stationary point 609. Providing additional pivot points may also be possible. For example, the additional pivot points are positioned on sites other than the ground station. The additional pivot points may be located on locations such as bends, corners, or tips of obstructions which are capable of anchoring to the tether cable. For example, these pivot points serve as temporary docking stations to which the aircraft is pulled towards following activation of the winch unit for cable retraction.

At 620, the winch is activated. As the tether cable 603 is wound back to the winch, the tethered aircraft is pulled to move in a reverse direction (indicated by arrow A) along the cable path. For example, the tethered aircraft moves towards a first pivot point 607.

Upon reaching the first pivot point, the tethered aircraft is then pulled to move towards the next pivot point. In this case, as shown in 630, the next pivot point is also the final pivot point. For example, the final pivot point 609 is located at the ground station 605. The tethered aircraft 601 successfully docks near the ground station in 640. While aircraft recovery is shown when the tethered aircraft is at rest on the ground, it is understood that recovery can be performed at any time and at any location. For example, during flight or in the air.

Other applications of the unmanned aircraft system may also be possible. For example, FIG. 7 illustrates a process flow 700 of the unmanned aircraft system delivering a payload, for example, an object, back to the ground station.

In 710, a tethered aircraft 701 with the aerial winch and cable unit is deployed from the ground station 705 to retrieve an object 711. For example, tether cable 703 is released from the tethered aircraft 701 at the start of the flight.

In 720, the object is retrieved by the tethered aircraft by, for example, a payload tether cable. The tethered aircraft when carrying the object may experience a high payload weight. For example, the maximum thrust generated by the propeller units of the tethered aircraft is not sufficient to overcome the payload weight of the tethered aircraft for continual flight travel. In such cases, the aerial winch and cable unit may be activated to exert a pull force on the tethered aircraft.

As shown in 730, the aerial winch and cable unit is activated. As this is similar to steps 620-640 described in FIG. 6, common elements or steps will not be described. For example, the winch is activated to retract or wind the tether cable. This in turn pulls the tethered aircraft to move in a reverse direction (indicated by arrow A) along the cable path. By employing the winch and cable unit, the system is able to recover heavy payloads that are not possible with the propeller units.

Figure 8:
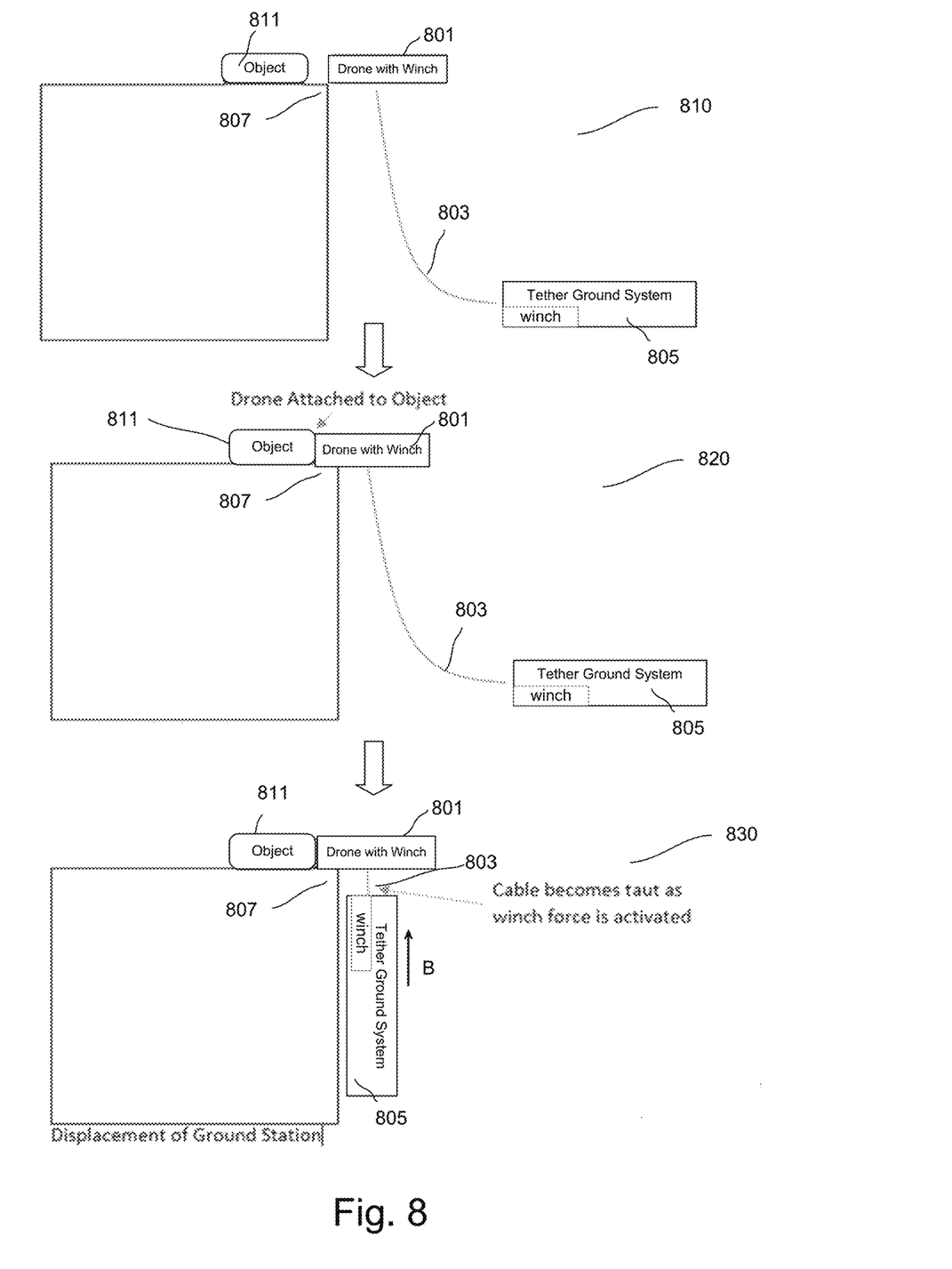
FIG. 8 illustrates a process flow of another application of an exemplary unmannered aircraft system.

FIG. 8 illustrates another application of an exemplary unmannered aircraft system. The system is similar to that described in FIGS. 6 and 7 except that a ground winch and cable unit is provided on the ground station. For example, both the tethered aircraft and the ground station can be mobile.

In 810, a tethered aircraft 801 with the aerial winch and cable unit is deployed from the ground station 805 to retrieve an object 811. For example, tether cable 803 is released from the tethered aircraft 801 at the start of the flight.

In 820, the tethered aircraft docks near the location where the object is positioned. For example, the tethered aircraft is anchored at a first pivot point 807 near the object. As shown, the tethered aircraft retrieves the object by, for example, a payload tether cable.

At 830, the ground winch and cable unit is activated. For example, the winch is activated to retract or wind the tether cable from the ground station. This in turn pulls the ground station towards the tethered aircraft which is anchored at the first pivot point (indicated by arrow B). For example, the entire system is configured to be portable and mobile.

Figure 9:
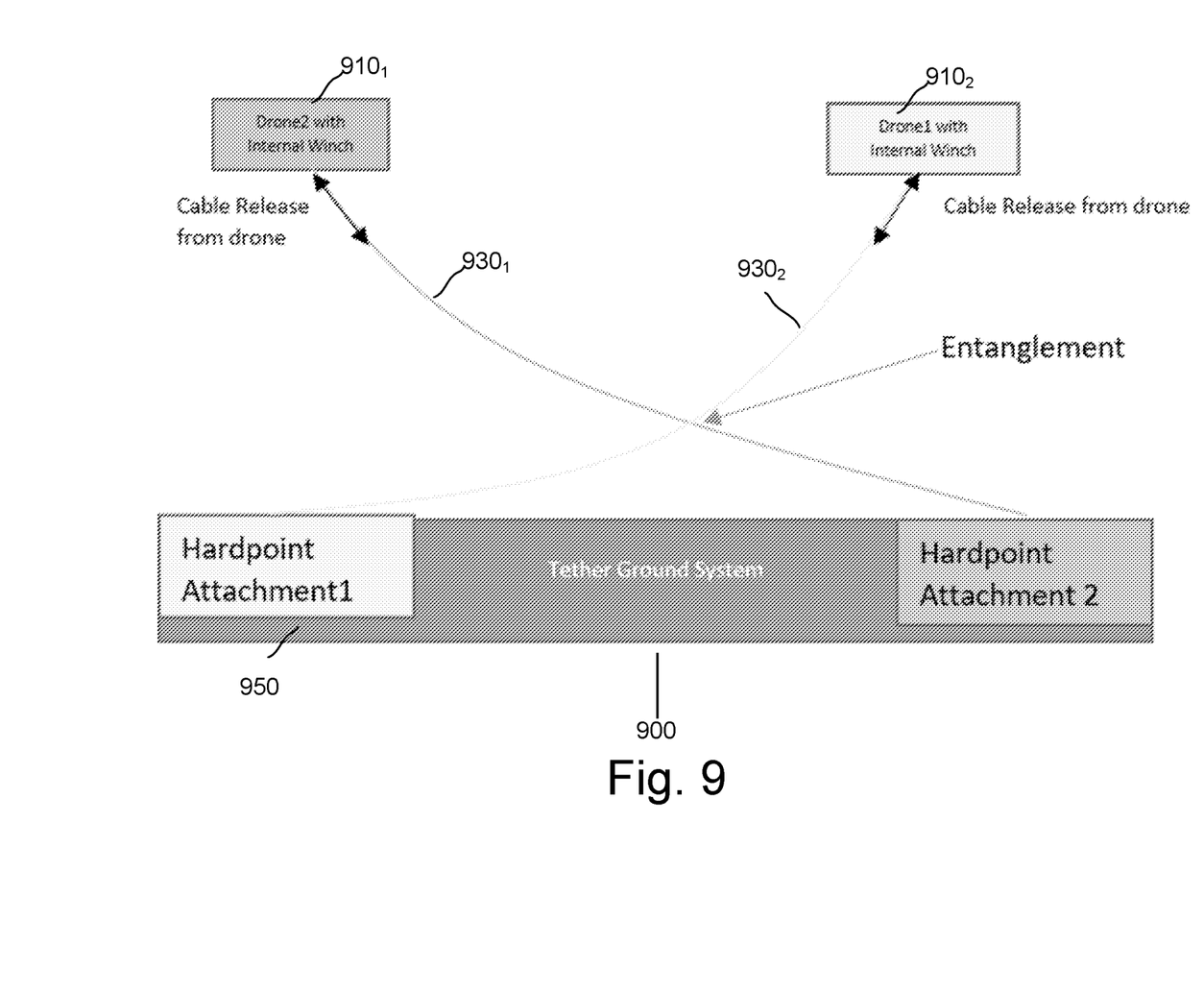
FIG. 9 illustrates another application of an exemplary unmannered aircraft system.

FIG. 9 illustrates another application of an exemplary unmannered aircraft system 900. As shown, the system may include more than one unmanned aircraft, for example, two unmanned aircraft $910_{1-2}$, tethered to a single ground station 950. For example, a tether cable $930_{1-2}$ of each of the unmanned aircraft is separately coupled to different locations on the ground station. Since each of the unmanned aircraft can freely manage release of its own tether cable, cable entanglements between proximate tether cables have minimal impact on flight operations. As such, a more flexible system that can perform multiple aircraft operations is achieved.

As already discussed, while the above describes an unmanned system for an aircraft, it is understood that the system is not limited to unmanned aircraft systems. Instead, the system is configured to work on any robotic systems that are, for example, commonly employed in applications such as security monitoring, delivery services, capturing pictures or videos, as well as other applications. For example, robotic systems that are configured to operate on land and/or even underwater. For example, instead of an aircraft, the system may include robots configured to operate on land and/or underwater. Providing other types of robots may also be useful The inventive concept of the present disclosure may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

The invention claimed is:

1. A system comprising:
a ground station with a ground winch and cable unit, the ground winch and cable unit includes a ground spool for accommodating a tether cable;
an unmanned robot comprising
a robotic controller module configured to control operations of the unmanned robot, and
a winch and cable unit mounted on the unmanned robot, the winch and cable unit includes a spool for accommodating the tether cable;
wherein the tether cable comprises
a first end connected to the spool of the winch and cable unit,
a second end connected to the ground spool of the ground winch and cable unit, and
wherein the tether cable comprises first and second extendable ends the first extendable end is extended by releasing the tether cable from the spool during operation, and the second extendable end is extended by releasing the teacher cable from the ground spool during operation; and
wherein the ground winch and ground cable unit is configured to maneuver the ground station by controlling retraction of the tether cable from the ground spool of the ground winch and cable unit.

2. The system of claim 1, wherein the unmanned robot is an aircraft, the aircraft includes an aircraft propulsion system for propelling the aircraft.

3. The system of claim 2, wherein the winch and cable unit of the unmanned robot is configured to maneuver the aircraft independently of the aircraft propulsion system by controlling retraction of the tether cable.

4. The system of claim 1, wherein the winch and cable unit of the unmanned robot includes a motorized winch.

5. The system of claim 4, wherein the motorized winch is configured to operate in a constant tension mode, an active sense mode, an active release mode or a combination thereof.

6. The system of claim 4, wherein the unmanned robot is an aircraft, the aircraft includes an aircraft propulsion system for propelling the aircraft.

7. A method of operating an unmanned robot comprising:
providing the unmanned robot comprising
- a robotic controller module configured to control operations of the unmanned robot, and
- a winch and cable unit mounted on the unmanned robot, the winch and cable unit includes a spool for accommodating a tether cable;

providing a ground station comprising a ground winch and cable unit, the ground winch and cable includes a ground spool for accommodating the tether cable;

tethering the unmanned robot to the ground station by connecting a first end of the tether cable to the spool of the winch and cable unit and connecting a second end of the tether cable to the ground spool of the ground winch and cable unit, wherein the first and second ends of the tether cable comprises first and second extendable ends, the first extendable end is extended by releasing the tether cable from the spool of the winch and cable unit during operation, and the second extendable end is extended by releasing the tether cable from the ground spool of the ground winch and cable unit during operation;

operating the robot using the robotic controller module, wherein during operation, the robotic controller module is configured to activate the spool to release the tether cable at the extendable end; and maneuvering the ground station by controlling retraction of the tether cable from the spool of the ground winch and cable unit.

8. The method of claim 7, wherein the unmanned robot is an aircraft, the aircraft includes an aircraft propulsion system for propelling the aircraft.

9. The method of claim 8, wherein the winch and cable unit of the unmanned robot is configured to maneuver the aircraft independently of the aircraft propulsion system by controlling retraction of the tether cable.

10. The method of claim 7, wherein the winch and cable unit of the unmanned robot includes a motorized winch, the motorized winch is configured to operate in a constant tension mode, an active sense mode, an active release mode or a combination thereof.

11. The method of claim 10, wherein the unmanned robot is an aircraft, the aircraft includes an aircraft propulsion system for propelling the aircraft.

12. The method of claim 7, wherein the unmanned robot is an aircraft, the aircraft includes an aircraft propulsion system for propelling the aircraft.

\* \* \* \* \*